United States Patent Office 2,992,738
Patented July 18, 1961

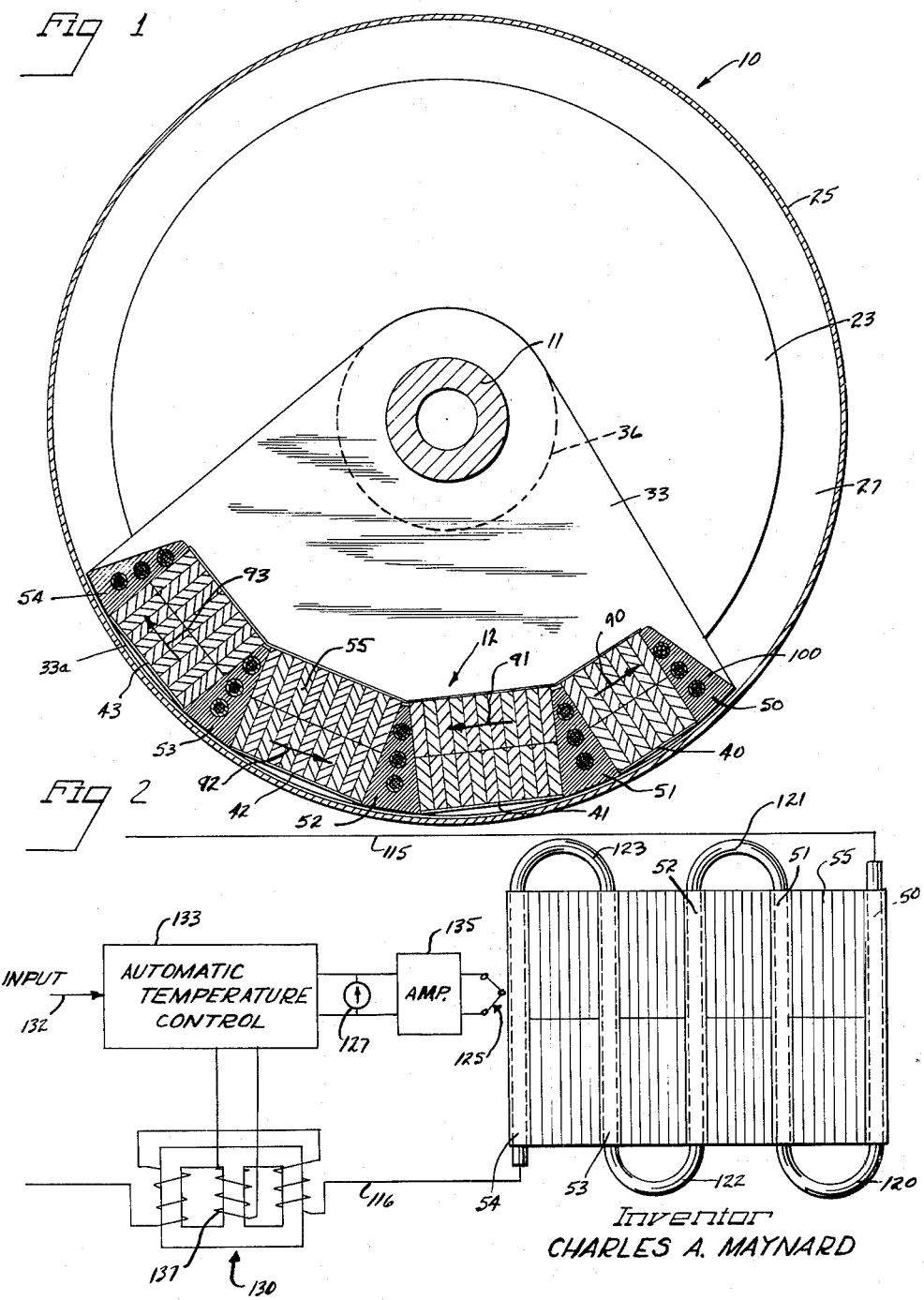

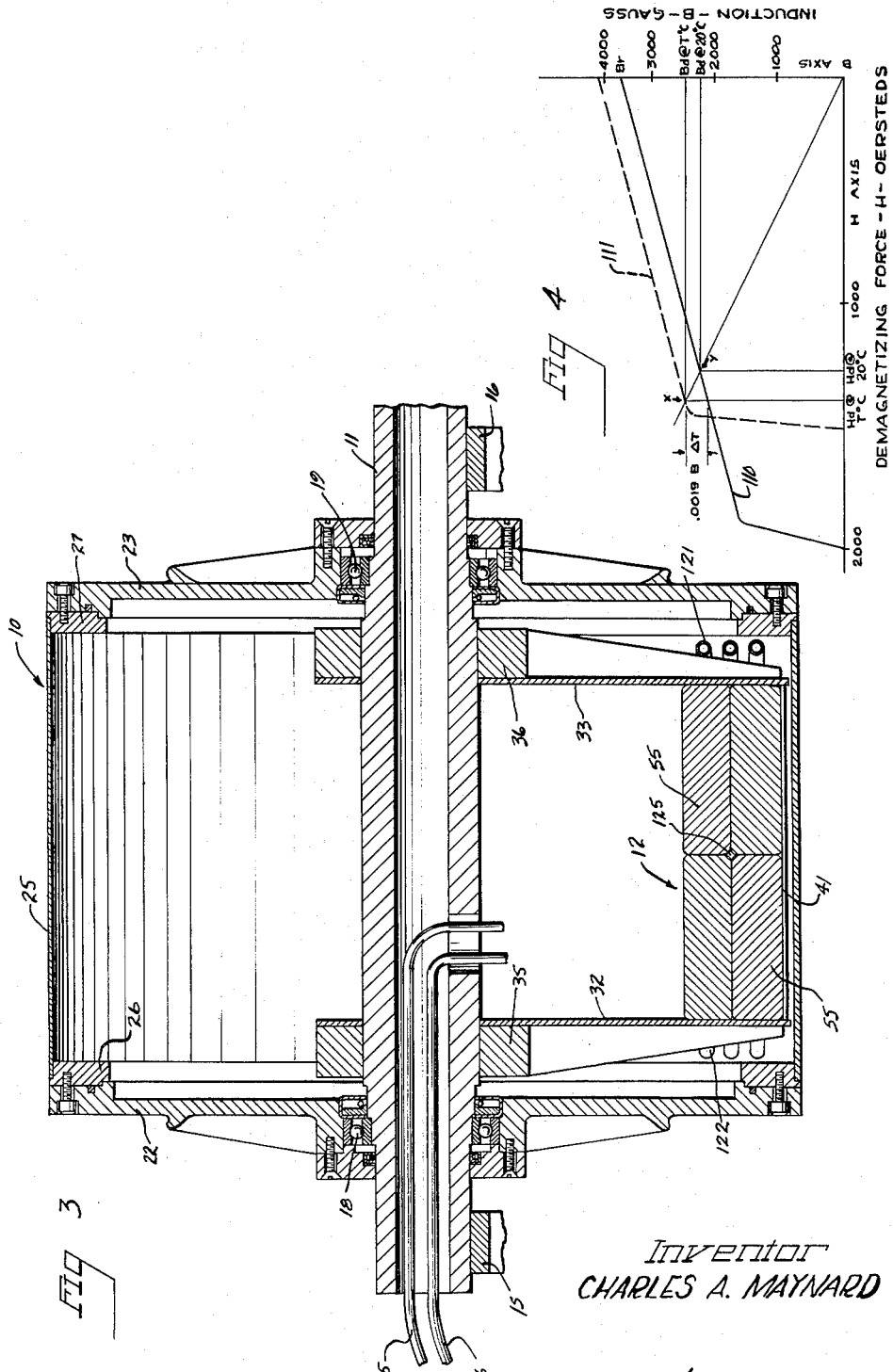

2,992,738
PERMANENT MAGNET SEPARATOR
Charles A. Maynard, Valparaiso, Ind., assignor to Indiana
General Corporation, a corporation of Indiana
Filed Apr. 20, 1959, Ser. No. 807,649
8 Claims. (Cl. 209—223)

This invention relates to a method and means for controlling the working magnetic field strength of a permanent magnet unit, and particularly to the control of the magnetic field strength of a permanent magnet separator.

It is an object of the present invention to provide a novel method and means for varying the magnetic field strength of a permanent magnet assembly over a relatively wide range.

A further important object of the present invention is to provide a novel method and means for controlling the temperature of operation of a permanent magnetic separator or the like.

A more specific object of the present invention is to provide a novel method and means for control of the field strength of a magnetic separator utilizing ceramic permanent magnets.

Other objects, features and advantages of the present invention will be apparent from the following detailed description taken in connection with the accompanying drawings, in which:

FIGURE 1 is a vertical cross-sectional view illustrating a permanent magnetic separator in accordance with the present invention having means for varying the magnetic field strength thereof;

FIGURE 2 is a somewhat diagrammatic layout plan view illustrating the control system of the present invention;

FIGURE 3 is a somewhat diagrammatic longitudinal sectional view of the separator of FIGURE 1; and FIGURE 4 is a graph illustrating certain characteristics of a ceramic permanent material known as "Indox V."

As shown on the drawings:

The present invention is particularly applicable to a permanent magnetic separator comprising a rotating drum 10 of non-magnetic material mounted for rotation on a generally fixed horizontal shaft 11 and having a permanent magnet assembly as indicated at 12 for providing an effective separation between magnetic and non-magnetic material which is brought into contact with the periphery of the drum 10, for example as a slurry, as is well known in the art.

Such a magnetic separator may include fixed bearings 15 and 16 mounting the shaft 11 and bearings such as indicated at 18 and 19 mounting the drum 10 for rotation on the axis of the fixed shaft 11. The drum may comprise end plates 22 and 23 of generally disk configuration secured to a shell 25 by means of rings 26 and 27. The drum components 22, 23, 25, 26 and 27 may be all of non-magnetic material.

The permanent magnet assembly 12 may be mounted on the shaft 11 by means of support plates 32 and 33 fixed to the shaft 11 by means of collars 35 and 36. The support plates 32 and 33 may have the general configuration of a sector of a circle with an arcuate lower periphery such as indicated at 33a in FIGURE 1 in closely spaced relation to the interior peripheral surface of the shell 25. The support plates may be of non-magnetic material and may have holding plates such as indicated at 40, 41, 42 and 43 of non-magnetic material extending between the support plates and secured thereto at their ends. The holding plates may extend along chords of the circular arcs defined by the lower margins such as 33a of the support plates 33 and 34 and may be disposed substantially as close as possible to the inner periphery of the rotating shell 25.

The permanent magnet assembly 12 comprises a series of pole pieces of magnetic material designated by the reference numerals 50, 51, 52, 53 and 54 and stacks of ceramic permanent magnet units 55 extending between the successive pole pieces. The pole pieces may be of triangular configuration and may be of solid magnetic material as illustrated or may be provided by strips of magnetic material arranged in an open triangular configuration. The pole pieces extend between the support plates 32 and 33 and are secured thereto at their ends. The lower margins of the pole pieces 50–54 may be substantially as close as possible to the inner periphery of the non-magnetic shell 25 while still providing the necessary clearance gap as with the holding plates 40, 41, 42 and 43. The permanent magnet units 55 may be of standardized dimensions, and may be arranged in two layers in the radial direction as seen in FIGURE 1 with two rows of stacks in each layer as seen in FIGURE 3.

In the illustrated embodiment, each of the ceramic permanent magnetic units 55 between a given pair of pole pieces is magnetized in the same direction through the thickness dimension of the permanent magnet slabs so as to provide directions of magnetization as indicated by the arrows 90, 91, 92 and 93 of FIGURE 1. With these directions of magnetization, pole pieces 50, 52 and 54 may be considered of north magnetic polarity, while pole pieces 51 and 53 may be considered of south magnetic polarity. Since the permanent magnet units between a given set of pole pieces are magnetized in the same direction, they produce a magnetic field of the same polarity along the axial length of the drum at the exterior surface of the shell 25. Material carried along by the exterior surface of the shell during rotation of the drum thus experiences successively a north pole at 50, a south pole at 51, a north pole at 52, a south pole at 53, and a north pole at 54, after which the magnetic material is no longer attracted to the drum surface and may be discharged in any suitable manner well known to those skilled in the art.

It is highly advantageous to utilize ceramic permanent magnetic material for the units 55 such as known by the trademark "Indox V." "Indox V" is an oriented barium ferrite material having a chemical composition represented by the formula $BaFe_{12}O_{19}$. The material is magnetized in the direction of orientation which is the direction of pressing of the material into the desired shape. The utilization of "Indox V" ceramic permanent magnets provides an improved energy source, enabling utilization of the total magnetic energy much more efficiently than prior art structures. The "Indox V" ceramic permanent magnet units can be suitably made into one specific standard shape such as a slab as shown, enabling the use of multiple numbers of this one shape in various arrangements to efficiently construct magnetic separators of different widths, of different diameter and of different magnetic intensities and field distributions. The magnetic properties of the slabs at right angles to the pressed dimension, i.e. the thickness dimension, are negligible.

In accordance with the present invention, the magnetic field strength of the successive poles of the permanent magnet assembly is varied by control of the temperature of the permanent magnet units. In the preferred construction illustrated in the drawings, the temperature of the ceramic permanent magnet units is controlled by means of temperature control members such as indicated at 100 extending within the generally triangular shaped magnetic pole pieces. By way of example, these temperature control units may be electric resistance heating elements such as "Calrod" units or may be heat exchange tubing carrying a suitable heat exchange fluid medium. It is found that within predetermined limits, a change of temperature of the ceramic permanent magnet units of a 100° centigrade produces approximately a 20% change in the magnetic flux produced by the permanent magnet units. The temperature of the "Indox V" permanent magnets may be suitably varied over a range from room temperature to several hundred degrees centigrade above room temperature to produce a corresponding very substantial reduction in magnetic field strength of the permanent magnet assembly. Changes in the magnetic field strength of the permanent magnet units within this temperature range are reversible so that as the temperature is again lowered to approximately room temperature, the magnetic field strength is restored substantially to its original value. The temperature of the units, however, cannot be raised above the Curie temperature (approximately 460° C.) without demagnetizing the permanent magnet units and thus requiring remagnetization of the units for further use. Normally the magnets should be heated and cooled slowly, for example at the rate of about 100° C. per hour, to avoid any possibility of breakage of the relatively brittle ceramic permanent magnet material.

FIGURE 4 illustrates the demagnetization curve for "Indox V." The solid line 110 indicates the curve at a temperature of 20° C., while dash line 111 illustrates the demagnetization curve for the same material at a temperature T below 20° C. The material may have a peak energy product $B_d H_d$ of 3.5 million where induction $B_d$ at the operating point is measured in gauss and the corresponding demagnetizing force $H_d$ is measured in oersteds. The value of the coercive force $H_c$ is about 2000 oersteds and the residual induction $B_r$ is about 3,840 gauss at room temperature. The peak energy product may correspond to operation at a flux density of 1920 gauss and a demagnetizing force of 1820 oersteds, for example. The properties are measured in the direction of orientation which is the direction of pressing of the material.

As indicated in FIGURE 4, the coercive force of the material drops with decreasing temperature, so that for a given operating point at room temperature such as point $y$ on curve 110 in FIGURE 4, there is a limit in the allowable temperature drop before a permanent loss of magnetization occurs. Any loss is, however, recoverable by remagnetization of the material by means of an external flux source. Where the material is subjected only to temperatures above the temperature where an irreversible flux loss occurs, the flux change is found to be approximately —.19% of its value at 20° C. per degree centigrade change in temperature. The coercive force may be taken to drop .5% of its value at room temperature per degree centigrade drop in temperature. Generally, it may be assumed that the magnetic material should not be subjected to a demagnetizing force, $H_d$, greater than 90% of the coercive force $H_c$ at the lowest temperature to which the material is to be subjected. Conversely, for a given operating point at room temperature, such as point $y$ on curve 110 in FIGURE 4, the temperature should not be lowered below the value T giving a new operating point $x$ where $H_d$ at T° C. is equal to .9 $H_c$ at T° C. For example, where point $y$ corresponds to a ratio of $B_d$ to $H_d$ at 20° C. of 1.20, the temperature T may be 10° C. to satisfy this condition. The ratio of $B_d$ to $H_d$ at a given operating point is termed the permeance coefficient. As temperature is changed for given operating conditions, the B and H values change, but their ratio remains relatively constant. Table 1 below tabulates permissible minimum temperatures for various minimum values of permeance coefficient, assuming an irreversible flux drop is to be avoided.

Table 1

| Minimum Permeance Coefficient | $H_d$ at 20° C. | $B_d$ at 20° C. | $H_d$ at T° C. | $B_d$ at T° C. | T° C. Minimum Reversible Temperature |
| --- | --- | --- | --- | --- | --- |
| 1.20 | 1,640 | 1,970 | 1,670 | 2,010 | 10 |
| 1.37 | 1,520 | 2,085 | 1,580 | 2,170 | 0 |
| 1.56 | 1,415 | 2,210 | 1,495 | 2,330 | —10 |
| 1.77 | 1,305 | 2,315 | 1,405 | 2,495 | —20 |
| 2.02 | 1,200 | 2,430 | 1,315 | 2,660 | —30 |
| 2.29 | 1,105 | 2,530 | 1,230 | 2,820 | —40 |
| 2.62 | 1,005 | 2,640 | 1,140 | 2,985 | —50 |
| 2.98 | 915 | 2,725 | 1,055 | 3,145 | —60 |

From Table 1, it can be seen that a coolant heat exchange fluid may be circulated in temperature control tubes positioned as indicated at 100 in FIGURES 1 and 2 to lower the temperature of the permanent magnet units 55 and thereby increase the output flux density. The minimum temperature for a reversible flux change depends on the minimum permeance coefficient at which the material is to operate as generally shown in Table 1.

Indox I is a non-oriented barium ferrite permanent magnet material which exhibits the reversible temperature effect of "Indox V" and can also be utilized as the permanent magnet material for the permanent magnet assembly shown in the present embodiment. This permanent magnet material also should be heated and cooled slowly, for example at the rate of approximately 100° C. per hour, since the material is brittle and susceptible to breakage due to thermal shock.

In the case where electrical heating elements 100 are utilized, suitable electrical wiring as indicated at 115 and 116 may be introduced along the interior of the hollow shaft 11 for energizing the units. The respective heating elements 100 of the successive pole pieces may be connected by curved portions such as indicated at 120, 121, 122 and 123 in FIGURE 2 which extend through suitable apertures in mounting plates 32 and 33, FIGURE 3. The curved portions are spaced inwardly from drum 10 so as not to interfere with rotation thereof. Each of the heating elements of pole piece 50 may be connected to line 115 while each of the heating elements of pole piece 54 may be connected to line 116. The heating elements 100 may be of equal resistivity or alternatively, elements of different resistivity may be associated with the respective pole pieces to produce a temperature differential in the permanent magnet assembly and therefore a variation in the magnetic field strength at the respective pole pieces for a given applied voltage to lines 115 and 116. Of course, the current in each heating element associated with each of the pole pieces may be individually adjusted to obtain different desired temperature gradients through the permanent magnet units and correspondingly more flexible adjustment of the magnetic field strength at different points along the periphery of the drum.

One or more magnetic field or temperature sensing elements such as indicated diagrammatically at 125 in FIGURE 2 may be provided at desired locations and a suitable indicating instrument 127 may be provided for indicating the strength of the magnetic field at least on a relative basis. Suitable manual means such as a rheostat or automatic means such as saturable core reactor 130 may be provided for regulating the electric current flow to the heating elements 100 so as to maintain a desired magnetic field strength. Suitable timing means may be incorporated into the system to insure against rapid temperature changes, so that, for example, if a new desired magnetic field strength is introduced at 132 of an automatic temperature control 133, the system would function to change the electric current gradually in the desired direction until the ultimate magnetic field strength was obtained.

By way of example, the sensing element 125 may comprise a suitable thermocouple which produces a varying output voltage as a function of temperature over the desired temperature range. The thermocouple may be suitably positioned within the drum 10, for example centrally between the layers and rows of permanent magnets which are disposed between pole pieces 53 and 54. The thermocouple 125 is shown connected to the input of an amplifier 135 whose output is connected to the indicating instrument 127 and the automatic control 133. The automatic control may deliver direct current to the reactor control winding 137 to control the alternating current voltage applied to lines 115 and 116. The direct control current to reactor winding 137 is changed at a slow rate until the temperature registered by thermocouple 125 corresponds to the desired value introduced at the input 132 of the control unit.

The structure of the present invention has the advantage that where the permanent magnet separator is installed in a location subject to low temperatures, the heating elements 100 may be continuously energized to maintain a minimum reversible temperature of the permanent magnet units in accordance with Table 1, for example, in the case of "Indox V."

Of course, suitable insulating material may be introduced into the drum consistent with the other requirements of the system in operation so as to increase the efficiency of temperature control with respect to the permanent magnet assembly.

It will be apparent that many modifications and variations may be effected without departing from the scope of the novel concepts of the present invention.

I claim as my invention:

1. In a magnetic separator having a conveyor movable along a predetermined path for conveying material to be separated and a permanent magnet assembly operatively associated with said conveyor to provide a working magnetic field along said path tending to cause separation of the portion of the material having magnetic properties from the remainder of the material, the improvement comprising heat exchange members disposed in heat exchange relation to said permanent magnet assembly to control the temperature thereof.

2. In a magnetic separator having a conveyor movable along a predetermined path for conveying material to be separated and a permanent magnet assembly operatively associated with said conveyor to provide a working magnetic field along said path tending to cause separation of the portion of the material having magnetic properties from the remainder of the material, the improvement comprising heat exchange members disposed in heat exchange relation to said permanent magnet assembly to control the temperature thereof, and means connected with said heat exchange members for energizing said members and operative to selectively vary the temperature of said permanent magnet assembly over a range of several hundred degrees centigrade.

3. In a magnetic separator having a conveyor movable along a predetermined path for conveying material to be separated and a permanent magnet assembly operatively associated with said conveyor to provide a working magnetic field along said path tending to cause separation of the portion of the material having magnetic properties from the remainder of the material, the improvement comprising heat exchange members disposed in heat exchange relation to said permanent magnet assembly to control the temperature thereof, means connected with said heat exchange members for energizing said members and operative to selectively vary the temperature of said permanent magnet assembly to thereby regulate the strength of the working magnetic field, and automatic control means controlling said energizing means to regulate the working field strength of said permanent magnet assembly in accordance with an input signal.

4. In a magnetic separator having a conveyor movable along a predetermined path for conveying material to be separated and a permanent magnet assembly operatively associated with said conveyor to provide a working magnetic field along said path tending to cause separation of the portion of the material having magnetic properties from the remainder of the material, said permanent magnet assembly comprising a pair of pole pieces of magnetic material and a series of ceramic permanent magnet units arranged in a stack between said pole pieces and in heat exchange contact therewith, the improvement comprising heat exchange members extending through and in heat exchange relation to said pole pieces to control the temperature of said permanent magnet units.

5. In a magnetic separator having a conveyor movable along a predetermined path for conveying material to be separated and a permanent magnet assembly operatively associated with said conveyor to provide a working magnetic field along said path tending to cause separation of the portion of the material having magnetic properties from the remainder of the material, said permanent magnet assembly comprising a pair of pole pieces of magnetic material and a series of ceramic permanent magnet units arranged in a stack between said pole pieces and in heat exchange contact therewith, the improvement comprising heat exchange members extending through and in heat exchange relation to said pole pieces to control the temperature of said permanent magnet units, and means connected with said heat exchange members for energizing said heat exchange members and operative to selectively vary the temperature of said permanent magnet units to thereby regulate the strength of said working magnetic field.

6. In a magnetic separator having a conveyor movable along a predetermined path for conveying material to be separated and a permanent magnet assembly operatively associated with said conveyor to provide a working magnetic field along said path tending to cause separation of the portion of the material having magnetic properties from the remainder of the material, said permanent magnet assembly comprising a pair of pole pieces of magnetic material and a series of ceramic permanent magnet units arranged in a stack between said pole pieces and in heat exchange contact therewith, the improvement comprising heat exchange members extending through and in heat exchange relation to said pole pieces to control the temperature of said permanent magnet units, means connected with said heat exchange members for energizing said heat exchange members and operative to selectively vary the temperature of said permanent magnet units to thereby regulate the strength of said working magnetic field, and automatic control means controlling said energizing means to regulate the working field strength of said permanent magnet assembly in accordance with an input signal.

7. A magnetic separator comprising a separator drum having an exterior surface for receiving and conveying material to be separated, means mounting said drum for rotation on its central axis, a permanent magnet assembly in said drum for providing a working magnetic field at said exterior surface tending to cause separation of the material having magnetic properties from the remainder of the material, said assembly comprising a series of pole pieces spaced along the inner periphery of said drum in close proximity thereto, stacks of slabs of ceramic permanent magnet material between the successive pole pieces and in heat exchange contact therewith, and means extending in heat exchange relation to said pole pieces for controlling the temperature of said ceramic permanent magnet material.

8. A magnetic separator comprising a separator drum having an exterior surface for receiving and conveying material to be separated, means mounting said drum for rotation on its central axis, a permanent magnet assembly in said drum for providing a working magnetic field at said exterior surface tending to cause separation of the material having magnetic properties from the remainder of the material, said assembly comprising a series of pole pieces spaced along the inner periphery of said drum in close proximity thereto, stacks of slabs of ceramic permanent magnet material between the successive pole pieces and in heat exchange contact therewith, said pole pieces having longitudinal passages therein extending the length thereof and generally axially of said drum, and elongated heat exchange members extending in said passages in heat exchange relation to said pole pieces to control the strength of the working magnetic field of said permanent magnet assembly.

References Cited in the file of this patent

UNITED STATES PATENTS

| | | |
|---|---|---|
| 1,130,648 | Ullrich | Mar. 2, 1915 |
| 1,655,847 | Siebs | Jan. 10, 1928 |
| 1,655,852 | Adams | Jan. 10, 1928 |
| 2,692,678 | Blind | Oct. 26, 1954 |
| 2,756,595 | Rathenau | July 31, 1956 |

OTHER REFERENCES

Electrical Engineering, volume 77, July 1952, pages 644–647.